United States Patent [19]
Carter et al.

[11] Patent Number: 4,902,772
[45] Date of Patent: Feb. 20, 1990

[54] DISPERSION POLYMERISATION PROCESS

[75] Inventors: Neil Carter, Northwich; Brian P. Griffin, St. Albans; William A. MacDonald, Guisborough; Timothy G. Ryan, Upton, all of England

[73] Assignee: Imperial Chemical Industries plc, London, England

[21] Appl. No.: 143,705

[22] Filed: Jan. 14, 1988

[30] Foreign Application Priority Data

Jan. 16, 1987 [GB] United Kingdom ................. 8700922

[51] Int. Cl.$^4$ ............................................. C08G 63/02
[52] U.S. Cl. .................................... 528/272; 528/274; 528/275; 524/730; 523/200; 523/216
[58] Field of Search ........................ 528/272, 274, 279; 524/730; 523/200, 216

[56] References Cited
U.S. PATENT DOCUMENTS 4,067,852  1/1978  Calundann ........................... 528/190
4,708,976  11/1987  Ryan .................................... 523/300

Primary Examiner—John Kight
Assistant Examiner—S. A. Acquah
Attorney, Agent, or Firm—Cushman, Darby & Cushman

[57] ABSTRACT

A process of polymerizing a polymerizable material in an inert organic liquid medium, in which the polymer formed from the monomer or monomers is insoluble, comprising dispersing the polymerizable material in the organic liquid in the presence of a finely, divided particulate material comprising an inorganic portion insoluble in the organic liquid medium and in combination therewith, preferably by covalent or ionic bonding, hydrocarbon chains containing at least 8 carbon atoms, the hydrocarbon chains being soluble in the organic liquid medium and heating the mixture to polymerize the polymerizable material to a required degree of polymerization. The process provides a means of stabilizing dispersion polymerizations which need to be carried out at very high temperatures to effect the polymerization.

8 Claims, No Drawings

DISPERSION POLYMERISATION PROCESS

This invention relates to methods of producing dispersions of polymers by polymerisation in an organic liquid and to the products thereof.

There have been many proposals for the dispersion polymerisation of polymerisable materials in organic liquids. Particularly successful methods are described in British Patent Nos. 1 095 931, 1 095 932, 1 373 531, 1 403 794, 1 419 199 and 1 583 142. Particularly successful methods for the polymerisation of addition polymers are described in British Patent Nos. 941 305, 1 052 241, 1 123 611, 1 143 404 and 1 231 614. In general these procedures make use of polymeric dispersing agents designed so as to have a portion Of a polymeric chain which is solubilised in the organic liquid in which the polymerisable material is to be polymerised and a group or entity which will effect anchoring of the solubilised polymer chain to the polymer being produced as a result of polymerisation of the monomer. In this way particles of solid polymer produced during the reaction can be maintained in a state of stable deflocculation at least until the polymerisation is complete. The aforementioned stabilisation is believed to result from the protection conferred on the particles by the adhered polymeric dispersant chains which provide a steric barrier to the close approach and agglomeration of adjacent particles in the polymerising dispersion. The application of this technique to the polymerisation of reactants which require very high polymerisation temperatures for example in excess of 250° C. is difficult because of the difficulty of designing polymeric dispersant molecules which have sufficient thermal stability and which will remain effective as dispersants at these elevated temperatures. An alternative method of stabilisation has now been developed which has been found to be particularly useful for the production of polymers which are formed under very high temperature conditions.

According to the invention there is provided a process of polymerising a polymerisable material in an inert organic liquid medium, in which the polymer formed from the polymerisable material is insoluble, comprising dispersing the polymerisable material in the organic liquid in the presence of a finely, divided particulate material comprising an inorganic portion insoluble in the organic liquid medium and in combination therewith, preferably by covalent or ionic bonding, hydrocarbon chains containing at least 8 carbon atoms, the hydrocarbon chains being soluble in the organic liquid medium and heating the mixture to polymerise the polymerisable material to a required degree of polymerisation.

The use of such finely divided particulate materials has been found to be effective in maintaining a dispersion of the polymerising material in the inert organic liquid medium in the form of deflocculated particles until the polymerisation has been completed. The resulting particulate product can be readily isolated from the organic medium and can be obtained as products of high molecular weight.

The particulate material should be in a state of fine subdivision in order to be effective as a dispersing aid in the polymerisation process. At least 95% by weight of the particulate material should have at least one dimension which is less than 1 micron and preferably less than 0.1 micron.

The polymerisable materials used in the process may be monomers which enter into polymerisation by addition polymerisation using free radical generation processes but the process is particularly useful for the production of condensation polymers, that is polymers formed by the union of two functional groups with the elimination of a low molecular weight by-product such as water, methanol, ethylene glycol, phenol or acetic acid. The process of the invention is particularly useful for those polymers which are formed at excessively high temperatures, that is in excess of 250° C. or 300° C. which are otherwise difficult to polymerise in the form of fine, deflocculated particles. At such temperatures it is difficult to form a dispersion of particles which is stable to flocculation during the whole of the polymerisation reaction. For many applications it is preferred that the product is in the form of a free flowing powder having an average particle size in the range between 10 and 2000 microns, preferably between 50 and 1000 microns. The present invention is ideally suited to producing such particles which remain in a deflocculated state whilst the polymerising contents are being stirred and up to the end of the polymerisation, but which can subsequently be rapidly separated from the inert organic liquid by, for example, filtration or sedimentation processes.

The polymerisable material used in the invention is not limited to material in monomeric form but includes all forms of partially polymerised precursors such as oligomers and prepolymers.

The polymerisable materials may be soluble in the inert organic liquid under the conditions of the polymerisation. Alternatively, the reactant or at least one of the reactants may be insoluble under these conditions. When at least one of the reactants is insoluble in the inert organic liquid it may be dispersed in the inert organic liquid. Such insoluble reactants may be in the form of a reactant which is liquid at normal temperatures, a reactant which is melted by heating in the organic liquid at a temperature not higher than the polymerisation temperature or a reactant which is a solid which cannot be melted at the temperature of polymerisation but which can be dissolved in a second material which is liquid at the temperature of polymerisation. The second liquid may be substantially immiscible with the organic liquid and is preferably inert towards polymerisation although it may itself be a reactant which takes part in the polymerisation. In these forms the insoluble reactants can be dispersed in the inert organic liquid as fine droplets in which the polymerisation can be effected.

As indicated the process is particularly suitable for polymerisation using the condensation reaction between complementary reactive groups in a monomer or monomers. Of particular interest are these condensation polymers capable of forming anisotropic melts, such as the thermotropic polyesters. These are conventionally made by batch melt processes at polymerisation temperatures in excess of 250° C. or 300° C. The present invention provides a useful process for the preparation of such polymers.

By "an inert organic liquid" is meant an organic liquid which does not take part in the polymerisation reaction; it may be either a pure liquid or a mixture. Where the polymerisation reaction is of the condensation type in which a by-product, such as water or ethylene glycol, is eliminated, the inert organic liquid medium is preferably capable of forming an azeotrope with the by-product; where the liquid medium is a mixture, it will usually suffice if one of the constituents is so capable. Where high molecular weight polymer products are required, for example, polymers suitable for fibre formation, it may be necessary to "force" the polymerisation reaction by deliberately removing the by-product from the azeotrope, e.g. by drying, freezing, physical or chemical methods.

The finely divided, particulate material preferably has an inorganic portion to which organophilic chains are covalently or ionically bonded. A particularly effective material may be derived from naturally occurring layer minerals. The preferred layer minerals are those having a significant layer charge resulting from the presence of cations within the layers and on the faces and edges of the layer minerals. These cations give rise to an exchange capacity enabling organophilic chains to be grafted onto the layer mineral by cation exchange. This exchange is typically achieved using primary or tertiary amines of sufficient chain length to provide organophilicity. Generally, a chain length of at least 8 carbon atoms is required, although longer chain lengths will be required if the exchange capacity of the layer mineral is low.

Suitable layer minerals capable of organophilic modification include the classes mica, vermiculite, smectite and montmorillonite. Smectite and montmorrilonite having a high exchange capacity are particularly suitable. The modification of vermiculite based layer materials to provide organophility is described in British Patent Specification No. 1 076 786. Organophilic layer minerals of the above classes are commercially available under the trade names 'Bentone 34' and 'Claytone 40' (both are dimethyl di-n-octadecyl ammonium exchanged bentonites), obtainable respectively from NL Chemicals Ltd and EEC International Ltd, and 'Bentone 38', an organophilic hectorite available from NL Chemicals Ltd.

Although it is preferred that the dispersion stabiliser should be in the form of a preformed additive in which the organophilic chain is associated with the core portion through covalent or ionic bonding it is possible to achieve the dispersion stability at elevated temperatures using a two-component system in which a finely divided inorganic material is added together with an organic polymer chain material carrying at least one reactive functional group per chain. It is believed that the functional groups may associate with or react with corresponding reactive functional groups on the surface of the finely divided inorganic material It is preferred that the finely divided inorganic material has itself been treated to give it an organophilic nature. For example, a fumed silica, methylated to provide a measure of hydrophobicity, can be used in conjunction with a polymer containing a functional group. Hydrophobic silicas produced according to the procedures disclosed in British Patent No. 932 753 are particularly useful.

The polymer carrying the functional group should have a polymer chain of molecular weight at least 500, and preferably at least 2000, which chain is soluble in the inert organic liquid medium, at least under the conditions of polymerisation. The functional groups of the polymeric dispersing material may be chosen from carboxyl, hydroxyl, amino, amido and sulphonic groups. The polymeric dispersing material should have sufficient thermal and chemical stability to remain effective under the polymerisation conditions used.

Although the specially designed block and graft copolymer amphipathic stabilisers of the type described in British Patent Nos. 1 095 931, 1 095 932, 1 373 531, 1 403 794 and 1 419 199 may be used as the polymer carrying the functional group it is preferred for reasons of cost and convenience to employ simpler random copolymers. Although the mechanism by which these random copolymers contribute in the presence of the inorganic material to stabilisation of the polymeric material being formed is not clear, they may, at least in part, act as precursors for stabilisers which are formed when a reactive group in the random copolymer enters into a reaction with a corresponding reactive group in at least one of the reactants or a partially polymerised product of the reactant or reactants. Additionally or alternatively, the reactive group of the random copolymer may react with a corresponding group on the surface of the inorganic material. The inorganic material may itself become attached to a particle of polymerising material by chemical reaction.

In addition to these possibilities of chemical reaction it is possible that the polymeric stabiliser carrying a reactive group and/or the inorganic material may act as stabilisers by virtue of being associated with the particles of polymerising material.

The polymeric stabilisers used in conjunction with an inorganic material must be able to withstand the appropriate temperature conditions likely to be encountered during the polymerisation. This may be in excess of 250° C. or even 300° C. Whilst materials such as copolymers of olefins and ethylenically unsaturated carboxyl containing monomers are surprisingly effective at temperatures in excess of 250° C., in view of their expected thermal stability level, polymers of greater thermal stability are preferred. Random polymers containing functional groups and having a major proportion of units derived from monomers selected from styrene, substituted styrenes, alkyl methacrylates and acrylates are particularly useful. Thus examples of preferred stabilisers are random copolymers containing at least 50% by weight of units derived from monomers selected from styrene, substituted styrenes, alkyl methacrylates and acrylates and from 1 to 25% by weight, preferably 2 to 10% by weight of units selected from ethylenically unsaturated carboxylic acid or carboxylic acid anhydrides, wherein the functional groups may be at least partly neutralised.

The degree of subdivision of the insoluble component in the stabilising system will depend to a large extent on the source of the inorganic material.

It is preferable that the surface area of the particulate material be at least 10 m$^2$/g preferably at least 100 m$^2$/g and more preferably at least 200 m$^2$/g. In the case of materials such as fumed silica the surface may be as high as 300 m$^2$/g and is generally at least 50 m$^2$/g. Standard methods can be used to obtain particle surface areas including the BET gas adsorption method (S. Bruanauer, P. H. Emmett and E. Teller, J Amer Chem Soc., 60, 309, 1938) and preferably an adsorption from solution method such as dye absorption (Pan Thi Harg, G. W. Brindley, Clays and Clay Minerals 18, 203, 1970). It is preferable that the surface area of particulate material available within the anisotropic melt forming polymer in the melt form be of the order of 1 m$^2$/g of polymer and that this surface area be achieved using less than 5% by weight of the particulate material and more preferably less than 2.5% by weight with respect to the weight of polymer. At these levels of additive the beneficial improvement in properties can not be attributed to reinforcement by the particulate material.

The particulate materials having at least one dimension of less than 1 micron may be essentially spherical particles such as the high surface silicas produced by flame hydrolysis.

A useful guide to the suitability of a finely divided particulate material for use in the polymerisation process is its dispersibility behaviour in a compatible liquid, particularly the liquid which is to provide the disperse phase in the polymerisation process. The compatibility and degree of dispersion in the liquid can be assessed by measuring the parameters known as "swelling volume" and "settling volume". These may be determined as follows.

In order to measure the swelling volume 10 g of sample are added to 100 milliliters of the chosen liquid in a 100 milliliter graduated measuring cylinder. After allowing to equilibrate for 30 minutes the volume of additive in the cylinder is measured. This is termed the swelling volume. It is desirably at least 20 ml in the chosen liquid, particularly if the liquid is that to be used as the disperse phase in the polymerisation.

The settling volume is assessed by mixing 10 g of the additive in 100 ml of the chosen liquid using a high shear mixer (such as a Silverson mixer). After dilution to provide 1 g of the additive (based on its inorganic content) per 100 ml of liquid 100 ml of the dispersion is placed in a 100 milliliter graduated measuring cylinder. After 24 hours the volume occupied by the sedimented additive is measured. This is termed the settling volume and should be at least 10 ml. For additives of high dispersibility this may be 100 ml (i.e. no observable sedimentation). Materials of such high dispersibility may be further distinguished by repeating the test at a dilution of 0.1 g additive in 100 ml liquid.

Although it might be expected that it would be advantageous to minimise the quantities of inorganic material present in the polymerisation so as to minimise the presence of such material in the final product it has been found that any such disadvantage is at least partially offset by an unexpected beneficial effect which arises from the presence of small quantities of inorganic fillers, particularly plate-like fillers in anisotropic melt forming polymers. In these systems the fillers appear to modify the flow behaviour of the anisotropic melts in a favourable manner so that enhanced levels of some of the mechanical properties are achieved.

Dispersion of the layer minerals in an organic media in non polar hydrocarbons can be increased by the addition of delamination activators such as methanol, acetone or propylene carbonate and by the use of high shear mixing equipment.

High surface area silicas may be colloidally dispersed in organic media using silane coupling agents or using polymeric dispersing agents, for example copolymers as described in British Patent Nos. 1 095 031; 1 095 932; 1 373 531; 1 403 794 and 1 429 199.

The concentrations of dispersants required to provide adequate dispersion stability is generally in the range 0.025 to 10% by weight of the polymerisable reactants but varies significantly depending on the dispersant chosen. The organophilic layer materials are least effective on a weight basis, generally requiring at least 0.25% to provide a significant beneficial effect. The lower limit is determined to a large extent by the degree of subdivision which can be obtained and it is generally the case that maximising the degree of subdivision will enable lower concentrations to be used effectively. The more finely divided fumed silicas show significant contributions to stability at concentrations as low as 0.025% by weight of the polymerisable reactants. The concentration of dispersant can be varied to control the particle size required from the fully polymerised dispersion. The lower the concentrations used the higher the size of particle that can be maintained without flocculation during the polymerisation. Whilst a product suitable for use a moulding powder (mean size 50 to 1000 microns) can be produced with low concentrations of additives higher concentrations will be required if a stable, deflocculated dispersion of finer particle size is required.

The inert organic liquid in which the reactants dissolve or are dispersed and which acts as a heat transfer medium for the reaction must be unreactive towards the reactants, have a boiling point substantially in excess of the reaction temperature used and must have sufficient thermal stability to withstand the conditions required for polymerisation of the reactants. Suitable materials include the terphenyls, particularly hydrogentated terphenyls commercially available under the trade name 'Santotherm'; a eutectic mixture of 73.5 percent diphenyl oxide and 26.5 percent diphenyl, commercially available under the trademark Dowtherm A; mixtures of various polychlorinated polyphenyls such as chlorinated biphenyls typified by those commercially available under the trademark Therminal FR; polyaromatic ethers and mixtures thereof such as those composed of mixtures of meta and para isomers, having boiling ranges in excess of 400° C., typical representatives of which are available commercially under the trademark 'Therminol' 77 and paraffin oil. The paraffin oil should be a material, the major part of which should have a boiling point of at least 320° C., although minor amounts of lower boiling materials can be tolerated. Typical paraffin oils are available from Castrol under the trade names 'Whitemor' and 'Puremor' White Oils, from Shell under the trade name 'Pallidex' and from Burmah under the trade name 'Castrol' WOM 14.

The invention is particularly useful for producing wholly aromatic polymers in a finely divided form.

By "wholly aromatic polymers" are meant polymers in which the reactant or each of the reactants used in synthesizing the polymer contribute at least one aromatic ring to the polymer backbone. A particularly interesting class of such "wholly aromatic polymers" are those which are capable of exhibiting optical anisotropy in the melt hereinafter termed "thermotropic liquid crystalline polymers".

Thermotropic liquid crystalline polymers have been extensively studied in the past few years and many disclosures of such polymers and processes for making them have appeared. Typical thermotropic polyesters and polyesteramides are described, for example, in British Patent Specification No. 1 507 207, U.S. Pat. Nos. 4,067,852, 4,083,829, 4,130,545, 4,161,470, 4,184,996 and 4,256,624. Such products can be formed into articles having excellent levels of physical properties, particularly stiffness and strength because the anisotropic melts which the polymers are capable of exhibiting leads to a high level of molecular orientation upon melt processing. The capability of these types of polymer to exhibit an optically anisotropic melt can readily be determined by methods known to those skilled in the art, for example as described in British Patent Specification No. 1 507 207.

The processes for preparing wholly aromatic polymers normally involve melt condensation of the appropriate reactants in the bulk, that is to say in a mechanically stirred molten mass of the appropriate reactants. Although such processes are commonly used, a restriction on the commercial process is that there is a practical limit to the melt viscosity which can be conveniently processed in such a process because of difficulties in stirring the melt adequately and in discharging the melt from the vessel. This puts a limit on the molecular weight that can be achieved during the autoclave process for commercial production. Where it is necessary or useful to obtain a higher molecular weight than can conveniently be achieved in a polymerisation vessel a subsequent post polymerisation step must be resorted to. Other disadvantages of the bulk melt polymerisation process include the problem of removing a 'heel' of undischarged residual polymer from the autoclave before the next polymerisation can be charged and the fact that bulk melt polymerisation method cannot be easily adapted to continuous production.

Thermotropic polymers made according to the process of the invention have surprisingly good properties compared to comparable thermotropic polymers made by conventional melt condensation polymerisation. The products generally have better colour, this advantage probably being largely due to the ability to polymerise at temperatures at least 20° C. below and up to 40° C. below the temperatures required to give the same polymerisation rate in a melt condensation polymerisation process.

The presence of the low level of particulate additive appears to allow very high levels of mechanical properties such as tensile strength, flexural strength and flexural modulus to be obtained. The improvement over comparable material made by a melt process is very much higher than could be attributed to any reinforcing effect from the small amount of particulate material present.

The thermotropic polymers of the present invention also have a greater degree of freedom in processing conditions. It is believed that the presence of the particulate additives reduce the melt viscosity of the compositions enabling lower processing temperatures to be used. From previous experience it would have been expected that if a finely divided filler were to have any effect on the melt viscosity it would be in the direction of increasing the melt viscosity.

The process of the invention is carried out in the presence of ingredients which are essential to the polymerisation of the reactants, for example catalysts and activators. In addition, the process provides a convenient way of intimately distributing those materials which are normally incorporated after the polymerisation process. Thus materials such as heat and light stabilisers, lubricants, pigments and nucleating agents may be added during the polymerisation process. The process is also useful for incorporating particulate and reinforcing fillers in the composition although these are more easily added to the composition after the polymerisation stage by melt compounding.

The invention is further illustrated by the following examples.

EXAMPLE 1

A 3 liter round bottom, flanged reaction vessel fitted with $N_2$ inlet, thermocouple, vigreux column (ca 19 cm) attached to condenser and receiver vessel, four bladed impeller (10 cm diam. angled (60° to horizontal) to give downthrust) was charged with acetoxybenzoic acid (607.5 g, 3.375 mole), acetoxy-naphthoic acid (287.1 g, 1.248 mole), acetic anhydride, (21.5 g, 2.4% on monomers), 40/40/10/10 copolymer of styrene/methyl methacrylate/ethyl acrylate/acrylic acid). (0.89 g, 0.1% on monomers), Aerosil R972 (2.47 g, 0.275% on monomers), potassium acetate (0.045 g, 50 ppm on monomers) and Santotherm 66 (895 g, 1/1 ratio with monomers). The mixture was then heated to 220° C. over ~60 mins under $N_2$. The mixture was stirred gently initially (~100 rpm), but the stirrer speed was increased to 450-550 rpm once the monomer had melted to give a clear solution at 170° C. As the temperature of the medium was raised further distillate began to be evolved ~230° C. and the temperature of the batch was raised to 320° C. over ~40 mins with constant evolution of acetic acid (290 g, 97% evolved). Product precipitated from solution at ~270° C. The reaction was then held at 320° C. for 30 mins and allowed to cool. The product was filtered, washed twice with acetone (~equivalent volumes) and dried under vacuum at 80° C. Light brown polymer particles of size 10–210 μm, but mainly 140–210 μm were obtained. After drying at 120° C. the melt flow index was measured at 310° C. using a 1.18 mm diameter die of length 8 mm and an applied load of 2.16 kg using the procedure of ASTM D 1238.

The settling volume of the R972 silica was measured in the presence of the acrylic copolymer in 100 mls of Santotherm. At 1% R972, 0.35% acrylic copolymer (wt/volume) the settling volume was 100 mls. At 0.1% R972, 0.35% acrylic copolymer the settling volume was 50 mls.

The powder was moulded into standard 3 mm thick tensile bars using a Boy 15S Dipronic injection moulding machine fitted with a 24 mm diameter screw with an L/D ratio of 17.

Melt plasticisation was carried out using a screw speed of 297 rpm and a back pressure of 50 MPa. The injection was done with a nozzle temperature of 310° C., a melt pressure of 70 MPa, an injection speed setting of 20 and an injection time of 15 seconds, test bar flexural modulus and strength and tensile strength were measured in accordance with ASTM D790-71 and ASTM D638-72 test methods. The results are shown in the table.

TABLE

| % wt/wt Ash from R972 Silica | % wt/wt Acrylic Copolymer | Flexural Modulus GPa | Flexural Strength MPa | Tensile Strength MPa | Melt Flow Index 2.16 kg at 310° C. |
|---|---|---|---|---|---|
| 0.39 | 0.14 | 12.5 | 214 | 197 | 3.5 |

COMPARATIVE EXAMPLE A

The procedure of Example 1 was repeated except in that the hydrophobic silica was omitted. When the temperature of the reaction was raised to 320° C. the polymerising particles flocculated into a mass after 7 minutes at 320° C. which could not be re-distributed in the heat transfer medium.

EXAMPLE 2

A 700 ml reaction vessel, equipped as in Example 1 was charged with p-acetoxybenzoic acid (110.5 g), 2,6-acetoxynaphthoic acid (52.2 g), 'Santotherm' 66 (244 g), 'Aerosil' R 972 (1.8 g) and an ethylene/methacrylic acid copolymer sold under the trade name 'Surlyn' 1601 (0.63 g). The reaction was carried out as described in Example 1 except in that the reaction mixture was heated at 320° C. for 40 minutes. The product consisted of particles varying in diameter from 10 to 270 microns which remained in a deflocculated state up to the end of the polymerisation and were separated by decantation and washing.

COMPARATIVE EXAMPLE B

The procedure of Example 4 was repeated except in that no 'Aerosil' R972 was present. As the temperature was raised to 320° C. flocculation occurred.

EXAMPLE 3

A 700 ml reaction vessel equipped as in Example 1 was charged with p-acetoxybenzoic acid (135 g, 0.75 mole) 2,6-acetoxynaphthoic acid (64.3 g, 0.28 mole), acetic anhydride (4.8 g, 0.047 mole), potassium acetate (0.01 g) and 'Santotherm' 66 (209 g, 1/1 ratio with monomer). The contents were heated to 320° C. over a period of 90 mins, under $N_2$, with stirring. At ~170° C. the mixture was observed to become clear. At this point a dimethyl di n-octadecyl ammonium ion exchanged bentonite clay (sold under the name 'Bentone' 34) (2.75 g, 1.375% by weight of reactants) was added slowly. The mixture was stirred at 900 rpm, the temperature increased to 320° C. and a mixed distillate (64 ml) of acetic acid and acetic anhydride was collected. Product precipitated from solution at about 270° C. as a dispersion of fine particles. The reaction was held at 320° C. for 30 mins and then allowed to cool. The product was filtered and washed with acetone and a creamy yellow powder was obtained. The distribution of particle sizes was obtained by sieve analysis.

>500 μm: 0.2%
500–250 μm: 14.8%
250–125 μm: 43.2%
<125 μm: 41.8%

EXAMPLE 4

A 700 ml reaction vessel equipped as described in Example 1 was charged with 2,6-acetoxynaphthoic acid (91.3 g), hydroquinone diacetate (38.4), terephthalic acid (32.9 g), 'Aerosil' R972 (1.8 g), polymeric stabiliser (as Example 1) (1.95 g), 'Santotherm' 66 (244 g), potassium acetate (0.0086 g) and acetic anhydride (3.9 g). The reaction was carried out as described in Example 1 but the suspension was stirred for 45 minutes at 320°. A polymer consisting mainly of spheres of diameter between 10–20 micron, but with some larger distorted spheres up to <70 micron, was obtained.

EXAMPLE 5

A 700 ml reaction vessel equipped as described in Example 1 was charged with 4-acetoxybenzoic acid (95 g) polyethylene terephthalate (67.9 g) in vac oven at 70° C. and having an IV of 0.73 (measured on a 1% by weight solution of the polymer in o-chlorophenol at 25° C.) 'Santotherm' 66 (244 g), Aerosil R972 (1.8 g), polymeric stabiliser (as in Example 1) (1.95 g), potassium acetate (50 ppm) and acetic anhydride (3.9 g). The reaction was carried out as described in Example 1. A polymer consisting of coarse particles between 140 and 500 microns was obtained.

EXAMPLE 6

A 700 ml reaction vessel was charged with 4-acetoxybenzoic aCID (200 g) 'Aerosil' R972 (2.2 g), polymeric stabiliser as in Example 1 (0.8 g), 'Santotherm' 66 (200 g), potassium acetate (0.01 g) and acetic anhydride (4.8 g). The reaction was carried out as described in Example 1. The product consisted of agglomerates about 420 microns in diameter made up of well fused spheres of about 140 microns diameter.

EXAMPLE 7

A 700 ml reaction vessel equipped as before was charged with 2,6-acetoxynaphthoic acid (200 g). 'Aerosil' R972 (2.2 g) polymeric stabiliser (0.8 g), as in Example 1, 'Santotherm' 66 (200 g), potassium acetate (0.01 g) and acetic anhydride (4.8 g). The reaction was carried out as described in Example 1. The polymer produced consisted of spherical particles about 125 microns in diameter.

EXAMPLE 8

A 700 ml round bottom flanged glass flask, equipped as in Example 1, was charged with p-acetoxybenzoic acid (135 g), 2,6 acetoxynaphthoic acid (64.3 g), a polymethylphenyl siloxane heat transfer fluid (200 g) (sold under the trade name DOW Corning silicone fluid 710H), a hydrophobic silica (0.55 g) (sold under the name Aerosil R972), the copolymer of styrene/methyl methacrylate/ethyl acrylate/acrylic acid described in Example 1 (0.1 g), potassium acetate (0.01 g) and acetic anhydride (4.8 g). The contents were heated to 320° C. over a period of 90 minutes. Initially the flask was heated slowly and when possible the stirrer was started. After 10 minutes the stirrer speed was increased to 450 rpm. The reaction mixture did not form a clear solution during the heating cycle due to the immiscibility of the monomers in this heat transfer medium. During the course of the polymerisation a mixed distillate (64 mls) of acetic acid and acetic anhydride was collected. The product was present as a dispersion of fine spherical particles. The dispersion was maintained at 320° C. for a further 30 minutes and then allowed to cool to 150° C., at which point the straw coloured polymer was filtered from the silicone fluid.

The product was stirred in hot Genklene, filtered, reslurried in acetone, filtered and dried. The polymer had an MFI of 1 (10 kg at 310° C.) and a particle size distribution of:

500–250 μm: 16%
250–150 μm: 59%
<12 μm: 25%

EXAMPLE 9

A 3 liter flanged reaction vessel equipped as in Example 1 was charged with p-acetoxy benzoic acid (316.7 g, 1.76 mole), isophthalic acid (233.6 g, 1.407 mole), hydroquinone diacetate (273 g, 1.407 mole) 2,6-acetoxynaphthoic acid (27 g, 0.117 mole), liquid paraffin (BDH, heavy GPR) (636 g), acetic anhydride (20.4 g, 2.4% on monomers), potassium acetate (0.114 g, 134 ppm) and 'Bevaloid' 6420 (4.6 g). The mixture was heated to 230° C. with slow stirring (~100 rpm) and $N_2$ flow (300 cm$^3$/min) over 45–55 minutes, at which stage acetic acid was beginning to be evolved. Claytone 40 (18.4 g, 2.2% on monomers) dispersed (by stirring) in liquid paraffin (214 g) at room temperature was added to the reaction mixture whereupon the stirrer speed was increased to 500–650 rpm to disperse the monomer melt in the heat transfer medium. The temperature of the dispersion was increased to 300° C. over 60–70 minutes and the evolved acetic acid (267.7 g, 95%) collected. The N₂ flow was increased to 1600 cc/min and the dispersion held at 300° C. for 80 mins. A mixture of the acetic acid and liquid paraffin (23 g) was evolved. The batch was cooled, filtered, slurried in Genklene twice and then dried. A powder consisting of dark cream spheres (30–180 μm) of MFI 0.3 (2.16 kg at 340° C.) was obtained.

The clay had an organic content of 38.7% and a swelling volume of 100 mls in methylene chloride. The setting volumes in methylene chloride measured at 1% and 0.1% wt/volume were 100 mls and 17 mls at equilibrium. Measurement of the particle size using an Andreasen pipette indicated that 64.5% of weight of the Claytone 40 had a particular size less than 4 μm.

EXAMPLE 10

A 3 liter reaction vessel equipped as in Example 1 was charged with p-hydroxybenzoic acid (244.67 g, 1.77 mole), hydroquinone (155.98 g, 1.42 mole), 2,6-hydroxynaphthoic acid (22.24 g, 0.12 mole), isophthalic acid (235.39 g, 1.42 mole), anhydrous potassium acetate (0.12 g, 180 ppm) and acetic anhydride (506.29 g, 4.96 mole).

The mixture was heated to reflux (145° C.) with slow stirring (~60 rpm) and slight N₂ flow (60 cm³/min). After 100 mins at reflux, the reflux condenser was replaced by a vigreux column (36 cm) attached to stillhead, condenser and receiver vessel. The reaction temperature was brought up to 170° C. over 25 mins, allowing 210 ml of acetic acid to distill over. Then ambient liquid paraffin (BDH, heavy GPR) (657 g), and 'Bevaloid' 6420 (6 g) were added. A N₂ purge of 130 cm³/min was applied and the mixture was heated to 240° C. over 4 mins. At 240° C. a total of 315 g of acetic acid distillate had been collected. 'Claytone' 40 (18.8 g) dispersed (by stirring) in liquid paraffin (200 g) at ambient temperature, was added to the reaction mixture (240° C.) and the stirrer speed increased to 550 rpm to disperse the monomer melt in the heat transfer medium. The reaction temperature was increased to 300° C. over 45–60 mins with a nitrogen flow (250–300 cm³/min).

The reaction temperature was maintained at 300° C. for 105 mins, with nitrogen flow 650 cm³/min initially, increased to 1000 cm³/min after 30 mins and further increased to 1500 cm³/min during the final 45 mins at 300° C. Total acetic acid distillate collected during the reaction was 570 g. (Some liquid paraffin was also distilled over).

The batch was cooled and filtered. The polymer was stirred in Genklene, filtered, reslurried in acetone filtered and dried.

Light creamy-yellow coloured polymer (30–150 μm, spheres), of MFI 0.5 (2.16 kg at 340° C.) was obtained. (The ratio of acetylated monomers ABA, ANA, HQDA and IA to the liquid paraffin heat transfer medium was 1:1 wt/wt in this reaction).

EXAMPLE 11

A 3 liter round bottom, flanged reaction vessel fitted with a nitrogen inlet, reflux condenser, thermocouple, stirrer and transfer tube was charged with 2,6-hydroxynaphthoic acid (13.58 g, 0.072 mole), p-hydroxybenzoic acid (358.69 g, 2.596 mole), hydroquinone (250.33 g, 2.272 mole), isophthalic acid (377.56 g, 2.272 mole), acetic anhydride (772.6 g, 7.574 mole), and potassium acetate (0.12 g). The contents of the flask were heated to reflux (147° C.) over a period of 15 mins with stirring (300 rpm). Reflux was maintained for 100 mins. After this time the reflux condenser was replaced with a Vigreux column (30 cm) and distillation apparatus. A N₂ purge (100 cm³/min) was applied to the flask, the temperature of the contents increased to 190° C. over a period of 30 mins and 375° cm³ of acetic acid/acetic anhydride distillate was collected.

At the same time as the above acetylation was being carried out the dispersion medium was prepared in a 5 liter round bottom, flanged flask fitted with a N₂ inlet, stirrer, thermocouple and distillation apparatus containing a 30 cm vigreux column. The dispersion medium comprised liquid paraffin (BDH/WOM 14) (1130 g) into which was mixed 196 g of a gel of 'Bentone' 38 (1 part) in liquid paraffin (9 parts).

A N₂ purge (100 cm³/min) was applied to the dispersion medium which was heated to 170° C. with stirring (400 rpm). The gel was produced using a Hobart high shear mixer model VCM40. A mixture of 18 kg liquid paraffin and 2 kg of 'Bentone' 38 was homogenised using slow stirring for 1 min prior to high shear mixing at full speed over a period of 20 mins. 550 g of propylene carbonate was then added at slow speed and the dispersion gelled using full speed over a period of 20 secs. The settling volumes of the 'Bentone' 38 in 100 ml Whitemor WOM 14 measured at 1% and 0.1% wt/volume based on the inorganic content weight) were 100 ml and 16 ml at equilibrium. The clay had a swelling volume of 68 mls in methylene chloride.

The transfer tube was heated to 140° C. and the acetylated monomers were transferred, when they reached 190° C., from the 3 liter flask to the 5 liter flask. The monomer dispersed in the paraffin immediately. The contents of the flask were heated to 300° C. over a period of 75 mins. Distillate from the polymerisation reaction started to come of at 220°–230° C. Antifoaming agent (Bevaloid 6420) was added when necessary. At 300° C. a 'sparge' tube was inserted into the reaction and a N₂ flow of 1000 cm³/min applied. Reaction was continued to 100 mins. (The proportion of 'Bentone' 38 with respect to the acetylated monomer weight is 1.5%. The ratio of the acetylated monomers to the liquid paraffin dispersion medium was 1:1 wt/wt).

The batch was cooled ad filtered. The polymer was stirred in Genklene, filtered, reslurried in acetone, filtered and dried. The melt flow index was measured at 340° C. using a 1.18 diameter die and an applied load of 5 kg. The powder obtained was moulded using the conditions described in Example 1 except that the nozzle temperature was 340° C.

A cream coloured polymer powder of MFI 2.0 (5.0 kg at 340° C.) was obtained. The following mechanical properties were obtained from the composition.

| % Wt/Wt Ash from Clay | Flexural Modulus GPa | Flexural Strength MPa | Tensile Strength MPa |
|---|---|---|---|
| 1.4 | 13.0 | 260 | 236 |

EXAMPLE 12

The procedure of the previous example was repeated except the proportion of 'Bentone 38' with respect to the acetylated monomers weight was reduced to 1.0% and 0.83%.

The particle size distribution of the product is shown in the following Table.

| % 'Bentone' 38 | Particle Size Fraction % | | | |
|---|---|---|---|---|
| | 250 μm | 250–125 μm | 125–75 μm | 75–53 μm | 53 μm |
| 1 | | 77.0 | 20.5 | 1.5 | 1 |
| 0.83 | 15.5 | 80.5 | 11.0 | 1 | 1 |

EXAMPLE 13

A 3 liter reaction vessel equipped as in Example 11 was charged with p-hydroxynaphthoic acid (335.06 g, 1.786 mole), p-hydroxybenzoic acid (664.93 g, 4.814 mole), acetic anhydride (706.11 g, 6.922 mole), terephthalic acid (6.38 g, 0.038 mole) and potassium acetate (0.12 g). The monomers were acetylated using the procedure described in Example 11.

A dispersion medium was prepared comprising liquid paraffin (Shell 'Pallidex' 17) (1276 g) and 76.79 of a gel of 'Bentone 38 in 'Pallidex' prepared as described in Example 11.

The proportion of 'Bentone' 38 with respect to the acetylated monomer weight was 0.6%. The ratio of acetylated monomers to liquid paraffin was 1:1 wt/wt.

The polymerisation conditions and product recovery method used were the same as in Example 11.

The product had an MFI of 12 (2.16 kg load at 310° C.). The particle size distribution was measured by sieve analysis.

250 μm: 7.5%
250–125 μm: 8.8%
125–75 μm: 51.8%
75–53 μm: 28.6%
53 μm: 3.3%

The settling volume of the 'Bentone' 38 in Pallidex 17 at 1% and 0.1% was 100 mls and 25 mls.

Test bars were moulded using the conditions described in Example 1. The results are shown in Table.

TABLE

| % wt/wt Ash from Bentone 38 | Flexural Modulus GPa | Flexural Strength MPa | Tensile Strength MPa | Melt Flow Index 2.16 kg at 310° C. |
|---|---|---|---|---|
| 0.54 | 12.3 | 217 | 205 | 5.0 |

EXAMPLE 14

A 3 liter reaction vessel equipped as in Example 11 was charged with p-hydroxynaphthoic acid (314.82 g, 1.678 mole), p-hydroxybenzoic acid (624.78 g, 4.523 mole), terephthalic acid (5.52 g, 0.033 mole), acetic anhydride (663.55 g, 6.505 mole) and potassium acetate (0.126 g). The acetylation procedure of Example 11 was repeated.

A dispersion medium was prepared comprising liquid paraffin (BDH/WOM 14) (1200 g) and 240 g of a gel of 'Bentone' 38 prepared as described in Example 11. The proportion of 'Bentone' 38 was 2% with respect to the weight of the acetylated monomers).

The acetylated monomers were heated to 190° C. and transferred into the dispersion medium which had also been heated to 190° C. The monomers dispersed immediately. The temperature was increased to 350° C. at a rate of ca 2° C./min. Distillation of the acetic acid byproduct of the polymerisation started at 220°–230° C. Antifoaming agent ('Bevaloid' 6420) was added when necessary. A $N_2$ sparge of 3 liters/min was applied when the temperature reached 295° C. The dispersion was then cooled to 250° C. over a period of 30 mins.

Samples were taken during the polymerisation and the MFI of the recovered product measured (2.16 kg load at 310° C.) as shown in the table.

| Sample No. | Temp °C. | MFI (2.16 kg @ 310° C.) | Time after dispersion (point mins) |
|---|---|---|---|
| 1 | 325 | 182 | 60 |
| 2 | 340 | 49 | 68 |
| 3 | 350 | 9 | 76 |
| 4 | 330 | 3.8 | 84 |
| 5 | 310 | 2.8 | 98 |
| 6 | 250 | 2.5 | 106 |
| 7 | 20 | 1.4 | |

EXAMPLE 15

A 5 liter reaction vessel equipped as in Example 1 was charged with 2,6 acetoxynaphthoic acid (12.74 g, 0.055 mole), p-acetoxybenzoic acid (358.99 g, 1.993 mole), isophthalic acid (289.68 g, 1.745 mole), hydroquinone diacetate (338.54 g, 1.745 mole), a solution of manganese acetate in acetic anhydride (0.5/wt/wt) 17.0 g), 'Bevaloid' 6420 (10 g) and liquid paraffin (SG=0.83–5 0.86 g/cm³) (1300 g).

The contents of the flask were heated with gentle stirring to 200° C. over a period of 95 mins. A dimethyl benzyloctadecyl ammonium exchanged bentonite (sold as 'Claytone' HT) (20 g) was dispersed (with stirring) in liquid paraffin (200 g) and added to the reaction vessel. The stirring rate was increased (~900 rpm) to disperse the monomers and the temperature taken to 300° C. The reaction was held at 300° C. for 120 mins. The dispersion medium was sparged with $N_2$ at 1000 cm³/min for the last 90 mins.

The batch was cooled, filtered, stirred in Genklene, filtered, reslurried in acetone, filtered and dried. The creamy yellow powder had a particle size distribution in the range 10–250μm.

EXAMPLE 16

A 700 ml reaction vessel equipped as in Example 1 was charged with p-acetoxybenzoic acid (32 g), hydroquinone diacetate (36.64 g), terephthalic acid (1.91 g), isophthalic acid (29.45 g), potassium acetate (0.0035 g) and acetic anhydride (4.0 g), a mixture of hydrogenated terphenyls (50 g) (sold under the trade name 'Santotherm' 66), the copolymer of styrene/methyl methacrylate/ethyl acrylate/acrylic acid described in Example 1 (0.5 g) and a hydrophobic silica (1 g) (Aerosol R972). The contents were heated under an atmosphere of nitrogen to a temperature of 320° C. over a period of 120 minutes. The stirrer speed was progressively increased to ~450 rpm. At 245° C. a further 100 g of 'Santotherm' 66 was added. At 264° C. 300 g of a polydimethyl siloxane silicone oil (sold under the trade name DOW Corning silicone fluid 210H/100 cs) was added causing a drop in temperature to 200° C. The mixture was then heated to 320° C. During the course of the reaction a mixed distillate of acetic acid and acetic anhydride was collected (39 mls). The product was present as a dispersion of spherical particles. The dispersion was maintained at 320° C. for a further 30 minutes and then allowed to cool to 200° C. at which point the polymer was filtered from the heat transfer fluid.

The product was stirred in hot Genklene, filtered, reslurried in acetone, filtered and dried. The polymer had a particle size distribution of:
>500 μm: 5.1%
500–250 μm: 80%
250–125 μm: 6.4%
<125 μm: 8.5%

EXAMPLE 17

A 5 liter reaction vessel equipped as in Example 1 was charged with 2,6 acetoxynaphthoic acid (63 g, 0.273 mole), p-acetoxybenzoic acid (296.1 g, 1.645 mole), isophthalic acid (295.5 g, 1.800 mole) hydroquinone diacetate (345.4 g, 1.780 mole) a solution of manganese acetate in acetic anhydride (0.5% wt/wt) (17.0 g), 'Bevaloid' 6420 (10 g) and liquid paraffin (SG=0.83–0.86 g/cm$^3$) (1300 g).

The contents of the flask were heated with gentle stirring to 200° C. over a period of 90 mins. Graphite (50 g, 5% on monomers) was then added. After 5 mins the graphite had mixed into the monomers and the paraffin had become clear. 'Claytone' 40 (20 g) dispersed in liquid paraffin (200 g) was added and the monomers dispersed with rapid stirring (~900 rpm). The temperature was taken to 300° C. and held there for 120 mins. The dispersion medium was sparged with N$_2$ (1000 cm$^3$/min) for the last 90 mins.

The batch was cooled, filtered, stirred in Genklene, filtered reslurried in acetone, filtered and dried. The black powder recovered had a particle size distribution in the range 10–250 μm.

EXAMPLE 18

A 700 ml flanged reaction vessel fitted with a nitrogen inlet (nitrogen flow rate 135 cm$^3$/min), thermocouple, Dean and Stark receiver, four bladed impellor (5.5 cm diameter, angled 45° to horizontal to give down thrust), nitrogen sparge tube (ntrogen flow rate 135 um$^3$/min), was charged with Nylon 6.6 salt (115.9 g, 0.442 mol) and a high boiling point petrol ('Tetraisobutane' 90 available from British Petroleum (BP) 200 g). The mixture was heated to 180° C. over 35 mins while stirring at 400 rpm, during this period a mixture of a hydrophobic clay gel (Bentone 38, 10% w/w clay in liquid paraffin, 30 g) and the high boiling point petrol (50 g) was heated to 159° C. The stirrer speed was increased to 700 rpm and the clay mixture added. The temperature of the reaction was increased to ca 245° C. (refluxing conditions) and held at this temperature. After 230 mins from adding the clay mixture the reaction was allowed to cool to room temperature. The contents of the vessel were filtered off, washed with Petroleum ether (bp 40°–60° C.) to yield the polymer in the form of cream coloured beads, with particles from 100–2000 microns diameter. The inherent viscosity of the polymer in formic and at 25° C. (1% w/w) was 1.9 dl/g.

EXAMPLE 19

A 3 liter flanged reaction vessel fitted with N$_2$ inlet (N$_2$ flow rate 50 cm$^3$/min), thermocouple, reflux condenser, four bladed impellor (10 cm diameter, angled 60° to horizontal to give down thrust), N$_2$ sparge tube (50 cm$^3$/min) was charged with Bisphenol A (306.43 g, 1.34 mol), isophthalic acid (111.43 g, 0.67 mol), terephthalic acid (111.43 g, 0.67 mol), potassium acetate (0.043 g, 0.438 m mol) and acetic anhydride (342.61 g, 3.36 mol). The mixture was heated to refluxing conditions (ca 140°–145° C.) and kept at this temperature for 4 hours. After cooling to ca 25° C. the reflux condenser was replaced by a Vigreux column (20 cm) attached to a condenser and receiver vessel. To the reaction vessel was added liquid paraffin (857.2 g), Bevaloid 6420 (4.3 g), and 1,2, 4-trichlorobenzene (85.7 g). The reaction vessel was fitted with a 1 liter equalising pressure dropping funnel containing a mixture of a hydrophobic clay gel (Bentone 38, 9% w/w in liquid paraffin, 142.7 g) and liquid paraffin (214.3 g). The mixture in the reaction vessel was heated up to 270° C. over 1 hour 25 min while stirring at 200 rpm. During this time acetic acid distilled over (ca 234.4 g distillate collected). The stirrer speed was increased to $^{ca}$ 550 rpm and the clay mixture added. The temperature of the reaction was increased to 275° C. over 20 mins and held at that temperature for 1 hour 50 min, during which time a further 131.5 g distillate was collected. The temperature was then raised to $^{ca}$ 300° C. over 1 hour 10 min and held at that temperature for a further 3 hours during which a further 34.6 g of distillate was collected. The cooled mixture was filtered off, washed twice in petroleum ether (bp 40°–60° C.) by suspending the polymer in the petrol and filtering off the polymer. This gave the polymer as a powder of particle size 2–60 microns diameter. The relative viscosity of the polymer in chloroform at 25° C. (½% w/v) was 0.58.

EXAMPLE 20

A 3 liter flanged reaction vessel fitted with nitrogen inlet (N$_2$ flow rate 135 cm$^3$/min), thermocouple, Dean and Stark receiver, four bladed impellor (10 cm diameter, angled 60° to horizontal to give down thrust), N$_2$ sparge tube (nitrogen flow rate 135 cm$^3$/min), and a 1 liter equalising pressure dropping funnel, was charged with dimethyl terephthalate (400 g, 2.08 mol), ethylene glycol (294 g, 4.74 mol), manganese (II) acetate tetrahydrate (0.5 g, 1.97 m mol) and a high boiling point petrol ('Tetraisobutane' 90, 705 g). The dropping funnel was charged with a mixture of a hydrophobic clay gel (Bentone 38, 10% w/w in liquid paraffin, 142,7 g) and the high boiling point petrol (214 g). The temperature of the mixture in the reaction vessel was raised to ca 200° C. over 1 hour while stirring at ca 200 rpm during which time methanol was distilled over as a by-product of a transesterification reaction, ca 90% of the theoretical amount of methanol was collected and drained off from the Dean and Stark receiver. The stirrer speed was increased to ca 500 rpm and the clay mixture added. The temperature of the system was raised to ca 245° C. (refluxing conditions). Ethylene glycol produced in the polymerisation plus the initial excess was distilled over as an azeotrope with the petrol and was collected in the Dean and Stark receiver. The system may be kept at refluxing conditions for as long as desired to increase the molecular weight of the product. It is also possible to cool and reheat the mixture. In this Example the mixture was kept ca 245° C. for 5 hrs 40 mins, followed by cooling and reheating to 245° C. for a further 7 hrs 45 mins to yield a fine off white powder (particle sizes 1–120 microns diameter) with a melt viscosity at 295° C. of 7123 poise (which would correspond to a solution intrinsic viscosity in o-chlorophenol at 25° C. of 0.83).

We claim:
1. A process for the production of a condensation polymer dispersed in an inert organic liquid medium, comprising mixing reactants for forming the condensation polymer in the organic liquid in the presence of a finely divided particulate material having at least 95% by weight of particles with at least one dimension less than 1 micron and comprising an inorganic portion insoluble in the organic liquid medium, and in combination therewith hydrcarbon chains containing at least 8 carbon atoms, the hydrocarbon chains being at least partially soluble in the organic liquid medium, and heating the mixture to produce a condensation polymer of a required degree of polymerisation in the form of stably deflocculated, polymer particles.

2. A process according to claim 1 in which at least 95% by weight of the particles of the finely divided material have at least one dimension less than 0.1 micron.

3. A process according to any one of claims 1 to 2 in which the particulate material is a layer mineral.

4. A process according to claim 3 in which the layer mineral has been given a surface treatment to improve the dispersibility of the mineral in a liquid.

5. A process according to claim 4 in which the layer mineral has been surface treated to provide organophilic chains grafted onto the layer mineral by cation exchange.

6. A process according to any of claims 1 to 3 in which a finely divided, particulate material is used in combination with an organic, polymeric dispersing agent of molecular weight at least 500 carrying at least one reactive functional group per polymer chain.

7. A process according to claim 6 wherein the particulate additive has itself been surface treated to render it organophilic.

8. A process according to claim 1 in which polymerisation is conducted at a temperature in excess of 250° C.

* * * * *